(12) United States Patent
Goldrick et al.

(10) Patent No.: US 8,707,574 B2
(45) Date of Patent: Apr. 29, 2014

(54) TEMPLATE

(76) Inventors: Robert H. Goldrick, Palmer, MA (US); Michael R. Goss, Hampden, MA (US)

(*) Notice: Subject to any disclaimer, the term of this patent is extended or adjusted under 35 U.S.C. 154(b) by 215 days.

(21) Appl. No.: 13/417,924

(22) Filed: Mar. 12, 2012

(65) Prior Publication Data

US 2012/0227275 A1 Sep. 13, 2012

Related U.S. Application Data

(60) Provisional application No. 61/464,843, filed on Mar. 10, 2011.

(51) Int. Cl.
*G01B 3/14* (2006.01)

(52) U.S. Cl.
USPC .................................................. 33/563

(58) Field of Classification Search
USPC ............................ 33/483, 485, 492, 563, 566
See application file for complete search history.

(56) References Cited

U.S. PATENT DOCUMENTS

| | | | | |
|---|---|---|---|---|
| 3,068,580 A | * | 12/1962 | Orthwin | 33/485 |
| 3,500,550 A | * | 3/1970 | Mihai | 33/563 |
| 3,798,781 A | * | 3/1974 | Wolfe | 33/563 |
| 5,557,996 A | * | 9/1996 | Reber et al. | 33/563 |
| 6,729,035 B1 | * | 5/2004 | Carrillo | 33/566 |
| 2004/0049935 A1 | * | 3/2004 | Tandy | 33/563 |
| 2008/0155849 A1 | * | 7/2008 | Bagley | 33/566 |
| 2011/0010955 A1 | * | 1/2011 | Zaremski | 33/492 |
| 2012/0204437 A1 | * | 8/2012 | Nethery | 33/566 |

* cited by examiner

*Primary Examiner* — G. Bradley Bennett
(74) *Attorney, Agent, or Firm* — O'Shea Getz P.C.

(57) ABSTRACT

A template for forming an opening in a surface includes a substrate having parallel first and second planar surfaces. The first planar surface includes parallel first and second lengthwise edges. The first planar surface also includes parallel first and second widthwise edges, where the second widthwise edge is perpendicular to the first and second lengthwise edges. First matching measurement index markings are located on the first planar surface along the first and second lengthwise edges. Second matching measurement index markings are located on the first planar surface along the first and second widthwise edges. A lengthwise slot is formed in the substrate parallel to the first and second lengthwise edges. Lengthwise measurement index markings are located on the first planar surface adjacent to a lengthwise edge of the lengthwise slot. A widthwise slot is formed in the substrate parallel to the first and second widthwise edges.

11 Claims, 2 Drawing Sheets

TEMPLATE

PRIORITY INFORMATION

This application claims priority under 35 U.S.C. §119(e) from U.S. provisional application Ser. No. 61/464,843 filed Mar. 10, 2011, which is hereby incorporated by reference.

BACKGROUND OF THE INVENTION

The invention relates to the field of templates for use in forming openings in surfaces such as floors, walls or ceilings for heating/cooling forced air systems.

Openings in surfaces such as floors, walls or ceilings for heating/cooling forced air systems are often done using a tape measure and straight edge, typically a framing (right angle) square. A spotting or pilot hole is drilled in desired bay (i.e., area of space located between floor joists or studs), generally 16" is the distance located between adjacent joists from center-to-center of the joist. With the reference point in installer determines where the center of the opening must be located by way of viewing the opposite side of surface that was drilled. The new location is marked without the use of a template or guide, and measured out from the reference point taking into account the size of desired opening using a tape measure. The desired distances are now marked and then using a straight edge the installer connects markings to form desired opening size. While marking the distances the installer must make certain that each corner of the desired opening are square with one another to assure proper fitting of supply or return duct boots. This technique of using a tape measure and a framing square is relatively slow and inaccurate.

There is a need for a template to facilitate the accurate and efficient forming of openings in surfaces such as floors, walls or ceilings for heating/cooling forced air systems.

SUMMARY OF THE INVENTION

Briefly, according to an aspect of the present invention, a template for forming an opening in a surface includes a substrate having a first planar surface and a second planar surface that is parallel with respect to the first planar surface. The first planar surface includes a first lengthwise edge and second lengthwise edge that is parallel to the first lengthwise edge. The first planar surface also includes a first widthwise edge and second widthwise edge that is parallel to the first widthwise edge and perpendicular to the first and second lengthwise edges. First matching measurement index markings are located on the first planar surface along the first and second lengthwise edges. Second matching measurement index markings are located on the first planar surface along the first and second widthwise edges. A lengthwise extending through slot is formed in the substrate parallel to the first and second lengthwise edges. Lengthwise measurement index markings are located on the first planar surface adjacent to a lengthwise edge of the lengthwise extending through slot. A widthwise extending through slot is formed in the substrate parallel to the first and second widthwise edges.

These and other objects, features and advantages of the present invention will become apparent in light of the following detailed description of preferred embodiments thereof, as illustrated in the accompanying drawings.

DETAILED DESCRIPTION OF THE INVENTION

Figure 1:
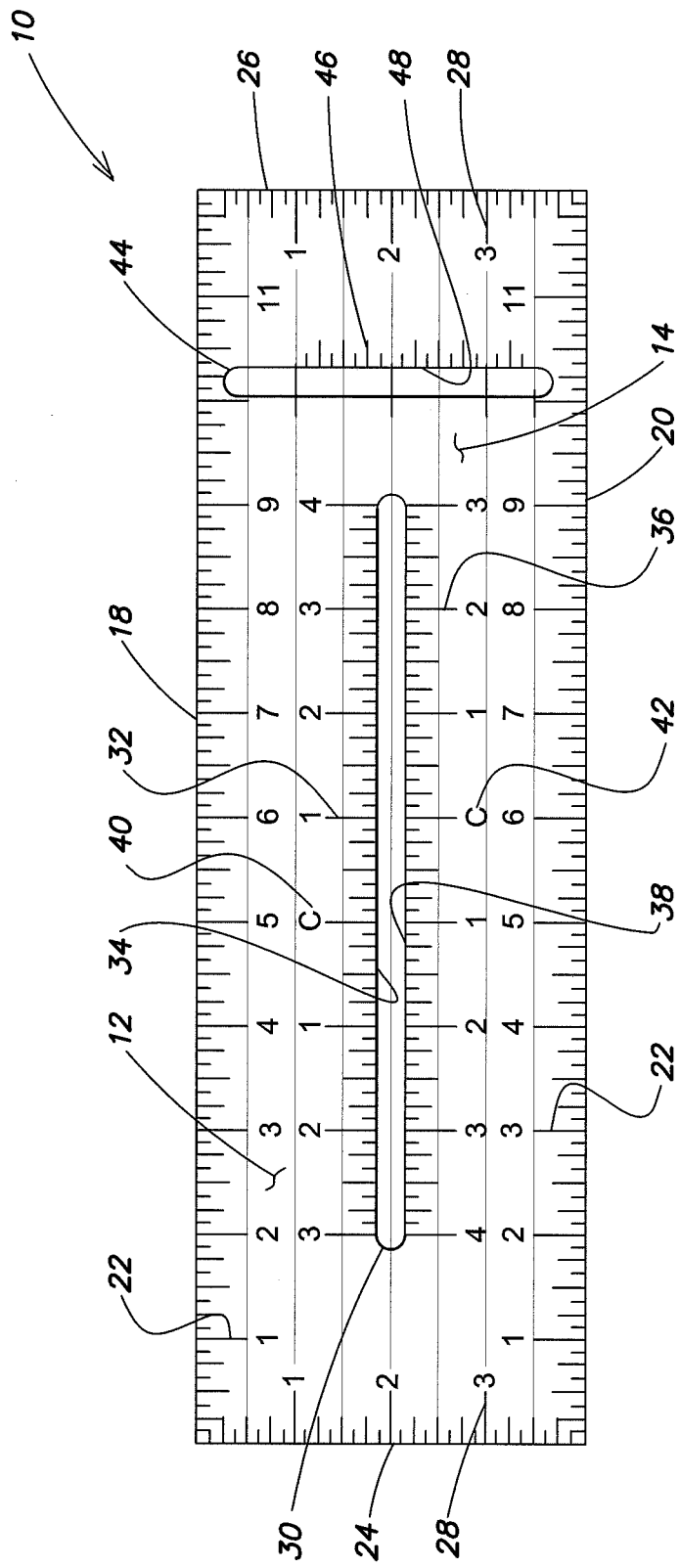
FIG. 1 is a top view of a template.

FIG. 1 is a top view of a template 10. The template includes a substrate 12 having a first planar surface 14 and a second planar surface 16 that is parallel with respect to the first planar surface 14. The first planar surface 14 includes a first lengthwise edge 18 and a second lengthwise edge 20 that is parallel to the first lengthwise edge. First measurement index markings 22 are located on the first planar surface along the first and second lengthwise edges 18, 20. The first measure index markings 22 adjacent to the lengthwise edges 18, 20 preferably match (e.g., are in alignment).

The first planar surface 14 also includes a first widthwise edge 24 and second widthwise edge 26, which is parallel to the first widthwise edge and perpendicular to the first and second lengthwise edges 18, 20. Second measurement index markings 28 are located on the first planar surface 14 along the first and second widthwise edges 24, 26. The second measure index markings 28 adjacent to the widthwise edges 24, 26 also preferably match (e.g., are in alignment).

A lengthwise extending through slot 30 is formed in the substrate 12 parallel to the first and second lengthwise edges 18, 20. First lengthwise slot measurement index markings 32 are located on the first planar surface adjacent to a first lengthwise edge 34 of the lengthwise extending through slot 30. Second lengthwise slot measurement index markings 36 are located on the first planar surface 14 adjacent to a second lengthwise edge 38 of the lengthwise extending through slot 30. The first lengthwise slot measurement index markings 32 include a center mark "C" 40, and the second lengthwise slot measurement index markings 36 include a center mark "C" 42. The center marks "C" 40, 42 are offset from one another along the lengthwise axis. In a preferred embodiment the first and second lengthwise slot measurement index markings 32, 36 each use the same measurement index/datum (e.g., inches). One of ordinary skill will appreciate that other measurement indices/datums may be used, such as for example centimeters of the metric system. The center mark "C" 40 may be used to layout the opening location for a 4"×10" opening, while the center mark "C" 42 may be used to layout the opening location for a 4"×12" opening. In this embodiment the center marks "C" 40, 42 are offset from one another by one inch. How the template may used to assist in laying out an opening shall be discussed in detail hereinafter.

A widthwise extending through slot 44 is also formed in the substrate 12, and extends in a widthwise direction parallel to the first and second widthwise edges 24, 26. Widthwise measurement index markings 46 are located on the first planar surface 14 adjacent to a widthwise edge 48 of the through hole 44. The slots 30, 44 may be about 0.25" wide. An example of using the template shall now be provided.

Figure 2:
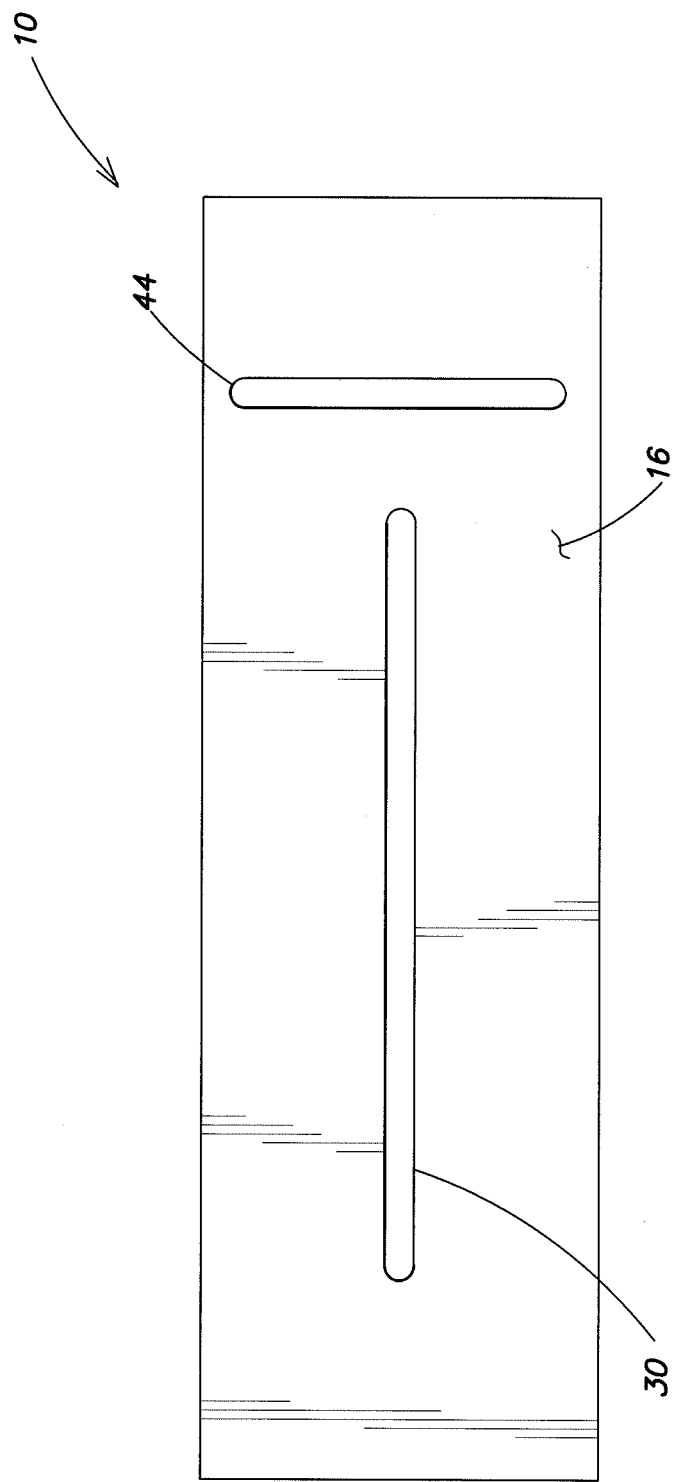
FIG. 2 is a bottom view of the template illustrated in FIG. 1.

FIG. 2 is a bottom view of the template illustrated in FIG. 1.

Referring to FIG. 1, an installer places the edge 18 of the template 10 against a rough framed wall, sheetrock, or baseboard in a desired bay (e.g., area of space between floor joists, generally 16" of space is located when measuring from center of a floor joist to center of adjacent floor joists). Using the scale of measurement located along the first and second widthwise edges 24, 26, the installer decides how far he would like the top edge of the opening of the wall. He then marks the measurement and moves the template 10 to a new location.

Based upon the size of the desired opening to be formed, for example 4"×10' or 4×12", the installer selects a scale on the template 10 to use. If installer wishes to layout a 4"×10" opening, he uses the center mark "C" 40 of the first lengthwise slot measurement index markings 32. Conversely, if the installer wishes to layout a 4"×12" opening, he uses the center mark "C" 42 of the second lengthwise slot measurement index markings 36. Next using a long, thin drill bit, the installer drills a hole in the floor located in centering slot using the "C" or center of the chosen scale as the point of penetration for the drill bit. Now the installer or a spotter is able to view the bit through the floor (e.g., while in the basement) and determines the measurement in either direction needed for the centering mark "C" for the desired hole size he is laying out.

The installer then slides the template 10 to the center of the bay using measurements obtained in the basement and the centering slot 30 as a guide. The installer then traces the desired opening size using the peripheral edges 18, 20, 24 and 26 of the template 10.

One of ordinary skill will of course recognize that the template is not limited to use for just the template sizes of 4"×10" and 4"×12". For example, it is contemplated that other common register openings including 2.25"×10" and 2.25"×12" may also be used. When using the template 10 to mark these size openings the pilot hole will be located towards the bottom edge of the opening. The installer may use the vertical measurement scale located at each end of the template to mark the 2.25" dimension. The top edge of the template will be the top edge of desired opening. To connect the two bottom corners of this 2.25"×10" or 2.25"×12" dimension simply use either the top or bottom edge of the template to trace a straight line, completing marking of desired dimension.

When using the template to center and mark a larger opening of 6"×12" do not connect bottom corners of the template when tracing. Since an additional 2" may be needed use the vertical measurement scale located at each end of the template 10 to mark 2" additional to each side of the opening and use either the top or bottom edge of the template to connect the bottom corners of the desired opening.

The template 10 may be for example formed of plastic, a polycarbonate (e.g., Lexan®), metal or wood. It is contemplated that the template may be foldable along one or more fold lines to reduce the storage size of the template.

Although specific dimensions are disclosed herein, one of appropriate skill will appreciate that these dimensions are cited by way of example only. Although the present invention has been shown and described with respect to several preferred embodiments thereof, various changes, omissions and additions to the form and detail thereof, may be made therein, without departing from the spirit and scope of the invention.

What is claimed is:

1. A template for forming an opening in a surface, comprising:
a substrate having a first planar surface and a second planar surface that is parallel with respect to the first planar surface, wherein the first planar surface includes a first lengthwise edge and second lengthwise edge that is parallel to the first lengthwise edge, and the first planar surface also includes a first widthwise edge and second widthwise edge that is parallel to the first widthwise edge and perpendicular to the first and second lengthwise edges;
first matching measurement index markings located on the first planar surface along the first and second lengthwise edges;
second matching measurement index markings located on the first planar surface along the first and second widthwise edges;
a lengthwise extending through slot formed in the substrate parallel to the first and second lengthwise edges and comprising lengthwise measurement index markings on the first planar surface adjacent to a lengthwise edge of the lengthwise extending through slot; and
a widthwise extending through slot formed in the substrate parallel to the first and second widthwise edges.

2. The template of claim 1, wherein the substrate has a substrate width and the widthwise extending through slot extends at least 80% of the length of the substrate width.

3. The template of claim 1, wherein the substrate has a length of about twelve inches and width of about four inches.

4. The template of claim 1, wherein the lengthwise extending through slot extends along a centerline of the width of the substrate.

5. The template of claim 1, wherein the first and second matching measurement index markings are in inches.

6. The template of claim 1, wherein the first and second matching measurement index markings are in the metric measurement system of centimeters.

7. The template of claim 1, wherein the substrate is plastic.

8. The template of claim 1, wherein the substrate is metallic.

9. The template of claim 1, wherein the lengthwise extending through slot and the widthwise extending through slot are both about 0.25 inches wide.

10. A template for forming an opening in a surface, comprising:
a substrate having a first planar surface and a second planar surface that is extending in a plane parallel to the first planar surface, wherein the first planar surface includes a first lengthwise edge and second lengthwise edge that is parallel to the first lengthwise edge, measurement index markings are located on the first planar surface along the first and second lengthwise edges, and the first planar surface also includes a first widthwise edge and second widthwise edge that is parallel to the first widthwise edge and perpendicular to the first and second lengthwise edges;
first matching measurement index markings located on the first planar surface along the first and second lengthwise edges;
second matching measurement index markings located on the first planar surface along the first widthwise edge;
a lengthwise extending through slot formed in the substrate parallel to the first and second lengthwise edges and comprising (i) a first lengthwise slot measurement index markings on the first planar surface adjacent to a first lengthwise edge of the lengthwise extending through slot, and (ii) a second lengthwise slot measurement index markings on the first planar surface adjacent to a second lengthwise edge of the lengthwise extending through slot; and
a widthwise extending through slot formed in the substrate parallel to the first and second widthwise edges.

11. A template for forming an opening in a surface, comprising:
a substrate having a first planar surface and a second planar surface that is extending in a plane parallel to the first planar surface, wherein the first planar surface includes a first lengthwise edge and second lengthwise edge that is parallel to the first lengthwise edge, measurement index markings are located on the first planar surface along the first and second lengthwise edges, and the first planar surface also includes a first widthwise edge and second widthwise edge that is parallel to the first widthwise edge and perpendicular to the first and second lengthwise edges;

first matching measurement index markings located on the first planar surface along the first and second lengthwise edges;

second matching measurement index markings located on the first planar surface along the first and second widthwise edges;

a lengthwise extending through slot formed in the substrate parallel to the first and second lengthwise edges and comprising (i) a first lengthwise slot measurement index markings on the first planar surface adjacent to a first lengthwise edge of the lengthwise extending through slot, and (ii) a second lengthwise slot measurement index markings on the first planar surface adjacent to a second lengthwise edge of the lengthwise extending through slot; and a widthwise extending through slot formed in the substrate parallel to the first and second widthwise edges.

* * * * *